E. L. FREESE.
TREE TRUNK SAW.
APPLICATION FILED SEPT. 13, 1913.
1,132,251.
Patented Mar. 16, 1915.
2 SHEETS—SHEET 1.
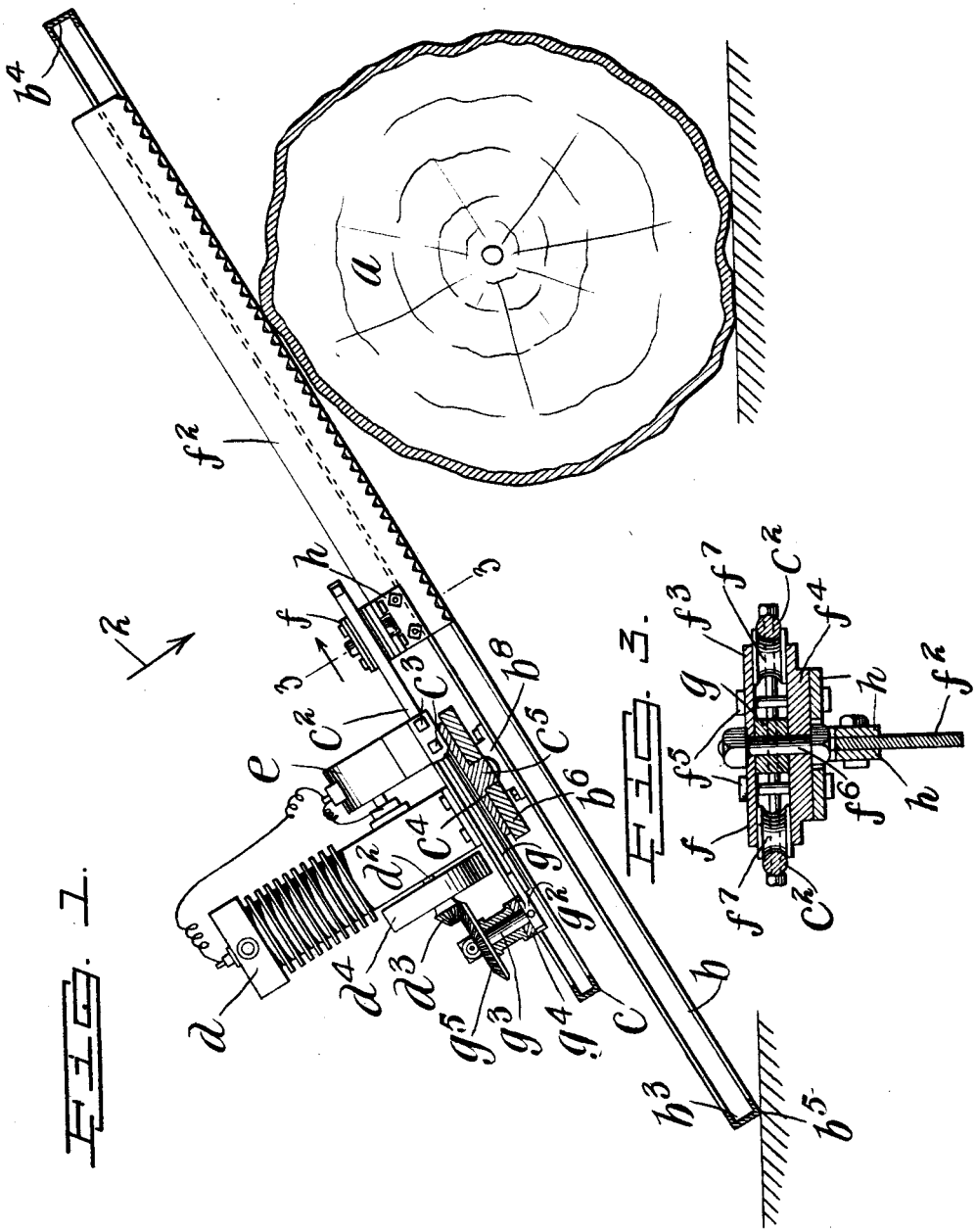
Witnesses:
H. E. Thompson
S. Andrews
Inventor
Etson L. Freese,
By his Attorneys E. L. FREESE.
TREE TRUNK SAW.
APPLICATION FILED SEPT. 13, 1913.
1,132,251.
Patented Mar. 16, 1915.
2 SHEETS—SHEET 2.
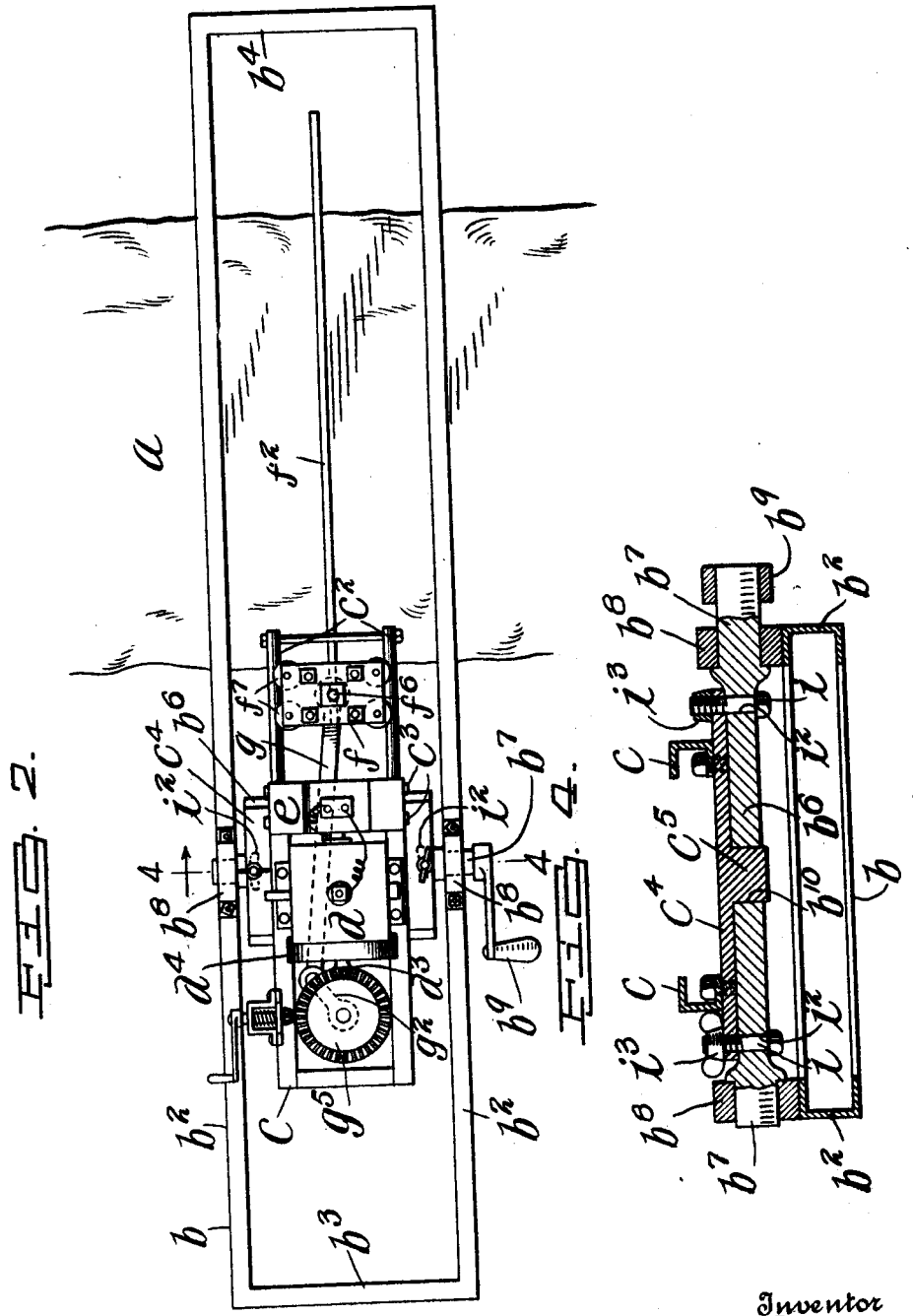
Witnesses:
H. E. Thompson
S. Andrews
Inventor
Etson L. Freese,
By his Attorneys

UNITED STATES PATENT OFFICE.

ETSON L. FREESE, OF NEW YORK, N. Y.

TREE-TRUNK SAW.

1,132,251.

Specification of Letters Patent.

Patented Mar. 16, 1915.

Application filed September 13, 1913. Serial No. 789,581.

*To all whom it may concern:*

Be it known that I, ETSON L. FREESE, a citizen of the United States, and residing at New York, in the county of New York and State of New York, have invented certain new and useful Improvements in Tree-Trunk Saws, of which the following is a specification, such as will enable those skilled in the art to which it appertains to make and use the same.

This invention relates to saws, or sawing machines for use in cutting tree trunks into cuts or logs of predetermined length after the tree or trees have been felled, and the object thereof is to provide an improved device of this class which is simple in construction and operation and portable in character, and which may be conveniently shipped from one field of operation to another, and easily moved about from place to place; a further object being to provide means whereby a tree felling saw of the class shown and described in U. S. Letters Patent granted to me October 4, 1910, No. 971,600, may be quickly and easily applied and used for the purpose of cutting a felled tree trunk into cuts or logs of predetermined length, and with these and other objects in view the invention consists in an apparatus of the class specified constructed and operating as hereinafter described and claimed.

The invention is fully disclosed in the following specification of which the accompanying drawings form a part, in which the separate parts of my improvement are designated by suitable reference characters in each of the views, and in which;—

Figure 1 is a side view of my improved apparatus for cutting tree trunks into cuts or logs and showing the same in position for use, part of the construction being in section;—Fig. 2 a plan view of the apparatus as shown in Fig. 1 and looking in the direction of the arrow 2 of Fig. 1;—Fig. 3 a section on the line 3—3 of Fig. 1, and;—Fig. 4 a partial section on the line 4—4 of Fig. 2.

In the drawings forming part of this specification, I have shown at $a$ a tree trunk to be cut into cuts or logs, and in the carrying of my invention into effect, I provide a supporting frame $b$ consisting of parallel side bars $b^2$ and end bars $b^3$ and $b^4$, and the parts of this frame are preferably composed of channel iron, as shown.

The supporting frame $b$ is adapted to be placed in position for use, as shown in Figs. 1 and 2, in which position one end portion thereof rests on the log $a$ and the other end portion thereof rests on the ground, as shown at $b^5$, and said frame is provided adjacent to the end portion thereof which, in use, rests on the ground, with a transverse rotary support $b^6$ having end trunnions $b^7$ mounted in bearings $b^8$ secured to the side bars $b^2$ of the frame $b$, and one of the end trunnions $b^7$ of the support $b^6$ is projected, in the form of construction shown, and provided with a crank $b^9$ by which said support may be turned or rotated. I also provide a sawing machine adapted to be mounted on the transverse support $b^6$ and comprising in its construction a yoke-shaped frame $c$, or a frame provided with parallel side bars, and in the side parts of the front end portion of which are secured parallel rods $c^2$, this connection being made, in the form of construction shown, by means of screws or bolts $c^3$ passed inwardly through the sides of said frame, and into or through said rods, and as thus constructed, it will be seen that the said rods are a part of the frame of the sawing machine, or a continuation thereof. The frame of the sawing machine is also provided with a transverse bottom plate $c^4$ provided centrally with a downwardly directed pivot stud $c^5$ adapted to enter a corresponding aperture $b^{10}$ in the support $b^6$ and with this construction, the sawing machine may be rotated with the support $b^6$ in a vertical plane.

The sawing machine involves a gasolene or other motor $d$, a magneto $e$ in electrical connection therewith, and mounted between the rods $c^2$ which form a front extension of the frame of the sawing machine is a cross head $f$ to which is secured a saw $f^2$. The cross head $f$ involves a top plate $f^3$ and a bottom plate $f^4$ connected by bolts $f^5$, and passed centrally through said cross head is a pivot pin or bolt $f^6$ by means of which the crank rod $g$ which operates said cross head is connected therewith. The crank rod $g$ extends rearwardly through the saw frame and is connected at its rear end with a crank $g^2$ on the lower end of a crank pin $g^3$ which passes upwardly through a suitable support $g^4$ mounted on the saw frame, and the upper end of which is provided with a beveled gear $g^5$, and the motor $d$ is provided with a power shaft $d^2$ having a beveled pinion $d^3$ which meshes with the gear $g^5$, and said power shaft is also provided with a balance wheel $d^4$.

All the parts of a sawing machine, as herein described, are exactly the same as in the patent referred to, and for a more detail description of the said sawing machine, reference may be made to said patent.

The cross head $f$ with which the saw $f^2$ is connected is provided on its opposite side with anti friction rollers $f^7$ which bear on and operate on the rods $c^2$, and in practice, the saw $f^2$ is secured to the cross head $f$ in a vertical plane, or in a plane at right angles to the plane of the supporting frame $b$, this connection being made by means of angle plates $h$ bolted to the saw and to the bottom plate $f^1$ of said cross head.

In addition to the movement of the sawing machine in a vertical plane, as hereinbefore described, the said sawing machine is also capable of slight rotary movement in a horizontal plane on the transverse rotatable support $b^6$, and this movement is controlled by bolts or screws $i$ passed upwardly through arc-shaped slots $i^2$ in the opposite end portions of the support $b^6$ and through the opposite side portions of the base plate $c^4$ of the sawing machine frame, and said screws or bolts are provided at their upper ends with thumb-nuts $i^3$ which may be manipulated so that the saw frame may be locked, when desired, against horizontal rotation on the support $b^6$.

The operation will be readily understood from the foregoing description when taken into connection with the accompanying drawings and the following statement thereof. The supporting frame $b$ may be placed in position, as shown in Figs. 1 and 2, the sawing machine mounted thereon and said machine put into operation. The sawing machine is almost exactly balanced on the support $b^6$, and in the operation of the saw, the said support and the machine may be given a vertical swinging movement in a vertical plane whenever desired, or the saw may be moved downwardly slightly by means of the crank $b^9$, and if desired the front end portion of the sawing machine, taken in connection with the saw may be slightly heavier than the rear end portion of said machine, in which event the machine would operate without a manipulation of the crank, as above described, but the use of the crank to control in a measure the work of the saw, or to give it the whole vertical movement and downward pressure will be found advisable under all conditions.

Instead of mounting the supporting frame $b$ on the log, as hereinbefore described, and then mounting the sawing machine on said support, the said machine may first be mounted on said support, and it will be understood that the machine may be detached from the support at any time for packing, shipping or other purposes, and for moving the said apparatus from one point to another in any particular locality. The provision of a horizontal rotary movement for the machine on the support $b^6$ is also not an absolutely essential feature and may or may not be employed, as experience may determine to be best.

My invention is not limited to mounting the rotary support $b^6$ on the frame $b$, and said support may be mounted in said frame if desired, and my invention is also not limited to a sawing machine of any particular construction, but I prefer the machine shown and described in the patent referred to, and various changes in and modifications of the construction herein described may be made, within the scope of the appended claims, without departing from the spirit of my invention or sacrificing its advantages.

Having fully described my invention what I claim as new and desire to secure by Letters Patent is:—

1. In a portable apparatus of the class described, a frame comprising parallel and connected side bars, a support detachably mounted in said frame transversely thereof and adapted to rotate in a plane at right angles to that of the frame, and a motor sawing machine mounted on a base rotatably and adjustably mounted on said support.

2. In a portable apparatus of the class described, a frame comprising parallel and connected side bars, a support mounted in said frame transversely thereof and adapted to rotate in a plane at right angles to that of the frame, and a motor sawing machine mounted on said support and provided with a saw adapted to operate between the side bars of the frame.

In testimony that I claim the foregoing as my invention I have signed my name in presence of the subscribing witnesses this 12th day of September, 1913.

ETSON L. FREESE.

Witnesses:
C. MULREANY,
H. C. THOMPSON.